United States Patent [19]

Meuse

[11] Patent Number: 5,285,363
[45] Date of Patent: Feb. 8, 1994

[54] HEAT TRANSFER UNIT

[75] Inventor: Michael A. Meuse, San Marcos, Calif.

[73] Assignee: Hughes-JVC Technology Corporation, Carlsbad, Calif.

[21] Appl. No.: 922,936

[22] Filed: Jul. 31, 1992

[51] Int. Cl.$^5$ ............................................. F21V 9/00
[52] U.S. Cl. ................................ 362/293; 362/294; 362/345; 362/373; 126/629; 126/674
[58] Field of Search ........................... 126/629-633, 126/674, 675; 362/293, 294, 345, 373

[56] References Cited

U.S. PATENT DOCUMENTS

| | | | |
|---|---|---|---|
| Re. 30,136 | 11/1979 | Schriefer | 126/674 |
| 4,095,428 | 6/1978 | Warren | 126/675 |
| 4,172,442 | 10/1979 | Boblitz | 126/674 |
| 4,296,734 | 10/1981 | Levins | 126/633 |
| 4,314,549 | 2/1982 | Swanson | 126/674 |
| 4,411,256 | 10/1983 | Fleming | 126/675 |
| 5,172,973 | 12/1992 | Spada | 362/294 |

*Primary Examiner*—Carroll B. Dority
*Attorney, Agent, or Firm*—Harness, Dickey & Pierce

[57] ABSTRACT

A xenon arc lamp (10, 12) used as a high intensity light source for a liquid crystal light valve projector includes a cold mirror (16) that reflects visible reading light (18a, 18b) to the liquid crystal light valve and transmits infrared light to a heat transfer unit (20) that is arranged to remove heat from the projector. The heat transfer unit (20), positioned adjacent the back of the cold mirror, is formed by a group of wire grids (50,52,54,56) that are mutually parallel and spaced close to one another with the openings of the grids displaced so as to be out of alignment with one another from grid to grid. The grids are mounted in a housing (28,30,34) which includes a heat reflective backup plate (62) on the far side of the grids and a cooling gas is caused to flow through the housing and over the grids to remove the heat transferred to the grid from the infrared radiation.

15 Claims, 3 Drawing Sheets

HEAT TRANSFER UNIT

BACKGROUND OF THE INVENTION

1. Field of the Invention

The present invention relates to heat transfer and more particularly concerns methods and apparatus for rapidly and efficiently removing heat from a heat source.

2. Description of Related Art

Various types of optical image projection systems, such as liquid crystal video projectors, for example, require a light source of very high intensity in order to project a relatively small image of an image source, such as a cathode ray tube, for example, at a distance upon a larger screen with sufficient illumination intensity for viewing in ambient light. The requisite high intensity of light is commonly provided by an arc lamp, such as a xenon arc lamp, which generates a very high intensity of light not only in the visible region, but also in the infrared region. The video projection system, of course, being a light viewing device, can usefully employ light energy only in visible wavelengths, between about 400 and 700 nanometers, for example. However, light energy in near infrared wavelengths, roughly between about 780 to 2500 nanometers, not only is not useful since it is not perceptible to the human eye, but tends to heat the various parts of a projector to such a degree as to significantly degrade or even destroy operability. The commonly used xenon arc lamp provides a significant amount of energy in the near infrared spectrum. Therefore, to avoid degradation or destruction of sensitive parts, including the liquid crystal light valve itself for example, the heat of this arc lamp must be dissipated.

Heat dissipation presently employed in systems of this nature generally are heat sinks that are formed of solid blocks or of solid blocks with an arrangement of heat dissipating fins formed of thermally conductive material. However, the speed and efficiency at which such heat sinks absorb and dissipate heat is poor. A number of problems result from the use of heat dissipating heat sinks in optical systems. The heat sink itself is subject to melting when it is unable to dissipate heat at a rate sufficient to handle all of the incident energy. A dichroic mirror, often termed a "cold" mirror, is frequently employed to filter out infrared energy by reflecting visible light to the projection system and passing infrared light to the heat sink. However, the heat energy passed through the mirror can result in reflection or black body radiation from the thermal mass of the heat sink which may be re-radiated back to and possibly through the cold mirror, and thus back into the heat sensitive optical system components. This can cause cracks or other structural weaknesses in the cold mirror. The re-radiated heat can degrade the coating on the cold mirror, which may cause the coating to flake off. As the coating degrades, light in the visible spectrum will pass through the mirror, together with the light in the near infrared region, thereby degrading efficiency of the optical portion of the system.

Still further, because of the relatively slow dissipation time of the thermal mass of a heat sink, the time it takes for the heat sink and other optical components in a system to cool down after system shut off can be relatively long, sometimes in the order of a quarter of an hour. Another problem due to relatively slow heat dissipation is an excessively high electrical power consumption of the overall system. High power consumption results from the use of high capacity fans and other cooling devices that are required to prevent excessive build-up of heat. Optical systems employing standard heat sinks tend to be large, because when excessive heat buildup is likely, system components must be separated from one another by adequate margins so that cool air can circulate to supplement heat dissipation.

A still further negative effect of the standard heat sink on the infrared filtering devices and on system electrical power consumption is the decrease in overall system lifetime and reliability.

Accordingly, it is an object of the present invention to provide for heat transfer by methods and apparatus that eliminate or minimize above mentioned problems.

SUMMARY OF THE INVENTION

In carrying out principles of the present invention in accordance with a preferred embodiment thereof, heat generated by a heat source is transferred by providing a thin body having a plurality of apertures and transmitting heat from the heat source to the body. A cooling gas is then flowed over the body. According to a particular feature of the invention, a reticulated sheet or grid of thermally conductive material is employed for transfer of heat. More specifically, a plurality of such thermally conductive reticulated sheets are employed with the apertures of each sheet being relatively misaligned from one sheet to the next, and all sheets lying in substantially parallel, mutually spaced planes that are substantially perpendicular to the direction of transmission of heat energy. In one embodiment a reticulated sheet having a convoluted surface is employed for heat transfer, where the convoluted surface has a number of portions that extend at oblique angles to the direction of transmission of heat energy from the heat source.

BRIEF DESCRIPTION OF THE DRAWINGS

In the accompanying drawings.

DESCRIPTION OF PREFERRED EMBODIMENTS

Figure 1:
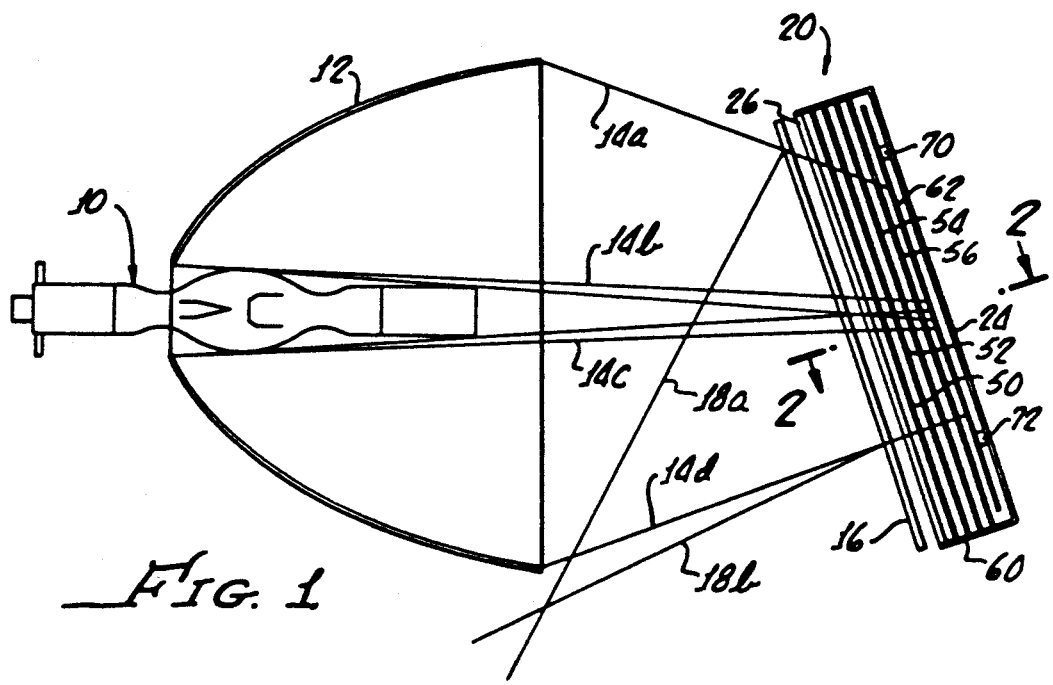
FIG. 1 schematically represents a top view of a xenon arc lamp employing a heat transfer unit of the present invention.

Illustrated in FIG. 1 are components of a known high intensity light source of a type that is commonly used in a video projection system, such as a system employing a reflective or an active matrix transmissive liquid crystal light valve device. A typical xenon arc lamp includes a light generating structure 10 mounted to and partly within an elliptical reflector 12 that transmits light along rays indicated at 14a, 14b, 14c and 14d to heat filter or a cold mirror 16. The mirror 16 is coated so as to reflect light in the visible spectrum, as indicated by reflected rays 18a, 18b which are fed via various optical components of the system to liquid crystal devices and then via projection lenses for projection of an image on a screen in any one of various well known arrangements of such standard type projectors. The cold mirror is a well known reflective device that is suitably coated so as to reflect light in the visible spectrum and transit light in the infrared spectrum. It is employed to prevent infrared light emitted by the arc lamp from passing with the visible light into the optical components of the system and thereby excessively heating such components and degrading their operation.

Light in the infrared region is transmitted through the cold mirror 16 and is incident upon a heat transfer unit, generally indicated at 20, that is placed closely adjacent to and is substantially coextensive with the illuminated area of the mirror. The heat transfer unit includes a housing 24 of a suitable thermally conductive material, such as aluminum, having a front wall or window 26 covering the entire front of the housing and made of heat resistant and heat transmissive material, such as pyrex. The remainder of the housing is made of aluminum and includes a rear wall 28 and a bottom 30 in which is formed an air intake opening 32. An upper portion 34 of the housing defines and confines an air flow chamber 36 that provides an input to an exhaust blower or fan 38 mounted in an output section 40 of the housing. The arrangement is such that operation of the fan 38 draws air into the housing through opening 32, as indicated by arrows 44, to flow through the housing and outwardly from the housing, as indicated by arrows 46. Of course the fan alternatively may be arranged to blow air through the housing.

Mounted within the housing, in this particular embodiment, are four thin, reticulated, flat sheets, such as woven screen or grids of a thermally conductive material, such as for example steel or hard anodized aluminum. Although other numbers of grids may be used, the illustrated arrangement shows four such grids, 50, 52, 54 and 56, each of which is identical to the others and all of which are fixedly mounted to and within the housing in mutually spaced and mutually parallel relation to one another. The grids 50 through 56 may be mounted in the housing in any suitable fashion, such as for example by having their end portions welded to the housing, as indicated at 60 in FIG. 1. Welding, of course, is but one of a number of different methods for securing the grids to the housing. Alternatively, the end portions of each of these grids can be bent at right angles to the main body portion, and these end portions suitably secured by welding or other fastening arrangements. Except for these end connections, each grid is free of contact with any other part of the heat transfer unit.

Also mounted within the housing on the distal side of the stack of four grids 50, 52, 54 and 56, that is, on the side of the stack of grids further from the mirror 16, and backup plate 62 formed of a continuous solid sheet of steel or stainless steel material which has no holes or perforations. The heat transmissive front face 26 of the housing is substantially coextensive with the several grids, which are all of the same size.

In one embodiment of the invention the grids are square and spaced from each other, from the front wall 26, and from the backup plate 62 at least one quarter inch. The front of the housing, front wall 26, is positioned about 0.375 inches from the back surface of the mirror. If the grids were to be positioned any closer to one another, it is possible that infrared light impinging upon one grid could be re-radiated to the next nearest grid, and thereby decrease efficiency of the heat transfer of the system as a whole.

Importantly, the various holes in the several grids are misaligned from one grid to another. This is illustrated in FIGS. 3, 4, 5 and 6, which respectively show a first grid of the stack (FIG. 3), parts of two grids of a stack (FIG. 4), parts of three grids of a stack (FIG. 5), and in FIG. 6 parts of four grids of a stack. In an exemplary embodiment each grid consists of a number of regularly arranged open spaces, each surrounded by steel wire, which has a round cross-section and a diameter of between 0.02 and 0.03 of an inch. Each opening of the grid is a rough square and has a size of 0.10 inches on a side to provide an open area of approximately 0.01 inches. As can be seen in comparison of FIGS. 3 and 4, a first sheet 50 is slightly shifted both horizontally and vertically relatively to the second sheet 52. Thus the vertical and horizontal wires of the second sheet 52 are effectively positioned in alignment with spaces of the first grid 50, with the vertical and horizontal wires forming the first and second grids being misaligned with respect to one another. Stated otherwise, neither the vertical nor horizontal wires of the second grid are in the "shadow" of the wires of the first grid except where wires of one grid cross wires of the other grid at right angles. Similarly, the third grid is displaced so that its horizontal and vertical wires are misaligned with respect to horizontal and vertical wires of both of the first and second grids, 50 and 52, and in like manner the fourth grid 56 is similarly displaced so that it too has its vertical and horizontal wires misaligned with all of the vertical and horizontal wires of each of the other three grids. The misalignment may be a random relation of misalignment, but is important in order to maximize the heat dissipation.

Radiated heat that does not impinge upon the first grid 50, but which passes through the holes in its grid structure is likely to impinge upon the vertical or horizontal wires of the second grid structure, which are not significantly occluded by wires of the first grid. Similarly, radiation passing through the first and second grid structures is more likely to impinge upon vertical or horizontal wires of either the third or fourth grid structures, either of which are significantly occluded by wires of the other grids. With this mutually offset relation providing a multiplicity of mutually misaligned grid structures, the effective target surface area provided by the several grids is greatly increased. Any radiated heat that passes through all the grids, or that is re-radiated from any of the grids rearwardly, impinges upon the reflective and continuous backup plate 62 through which none of the radiation will pass because it is a continuous solid sheet. In one embodiment this sheet is formed by a solid square block of stainless steel approximately 0.03 inches thick and 42 inches on a side, which is the size of each of the grids. Because the backup reflective plate can become considerably hotter than any of the grids, it is fixedly mounted to the back wall 24 of the housing by means of spacer blocks, including blocks 70 and 72, formed of a thermally non-conductive material, such as ceramic. As mentioned above, the backup plate essentially functions as a reflective device to reflect infrared light not absorbed by the grids back towards the grids, from which the heat may be more efficiently dissipated. Presence of the backup plate prevents components situated adjacent the outside of the lamp housing from melting. The backup plate also protects against other adverse effects of excessive heat buildup in the system including diminished reliability and life.

The heat transfer unit in general may have any desired overall shape and dimension. In a particular embodiment shape and dimensions are selected on the basis of dimensions of the footprint of the light beam produced by the arc lamp that is incident on the grid or series of grids, and, in addition, upon the distance between the cold mirror and the heat transfer unit. In a presently preferred embodiment the heat transfer unit may be roughly elliptical in shape to approximate the shape of the beam incident upon the mirror from the arc lamp, where the arc lamp may employ a ten inch elliptical reflector. Thus the housing, grids and backup plate may have any one of a number of different shapes, from square to elliptical.

As previously mentioned, heat transmitted through the cold mirror to the heat transfer unit impinges upon one or the other of the several grids or upon the backup plate. Some of this heat may be re-radiated back from the grids toward the mirror. However, the amount of heat energy reflected from the grid type sheet structure is considerably less than the amount of heat reflected from a conventional solid mass heat sink device. The latter will reflect a quantity of heat that is two to four times greater than the quantity of heat reflected from the described grids. Further, the wire used in the construction of the present grids has a round cross-section, and therefore reduces the probability that reflected infrared light will be reflected directly back towards the heat source and increases the probability that such reflected heat will impinge upon other ones of the grids that are more closely spaced to the mirror.

Although reticulated wire sheets or grids have been described, the several apertured sheets may take the form of commonly available aluminum sheets formed with many closely spaced apertures. Various types of apertured or perforated thin conductive sheets may be used and assembled with mutually offset or misaligned apertures.

In operation of the described device, a heat radiated from the lamp and transmitted through the cold mirror impinges upon one or the other of the several heat absorbing and thermally conductive grids, and simultaneously is re-radiated from the grid to the cool air that is caused to flow across the grids through the housing by operation of the fan 38. The arrangement provides a greatly increased surface area of the thermally conductive transfer unit material. That is, the arrangement of mutually spaced small round wires of thermally conductive material provides an increased surface area both for reception and therefore absorption of heat transmitted through the cold mirror and for re-radiation and conduction of heat absorbed by the grids into the flowing stream of cooling air. Thus a much more rapid heat absorption and heat transfer is accomplished. The described grid structures transfer heat more efficiently and at a faster rate than the conventional heat sink.

Figure 2:
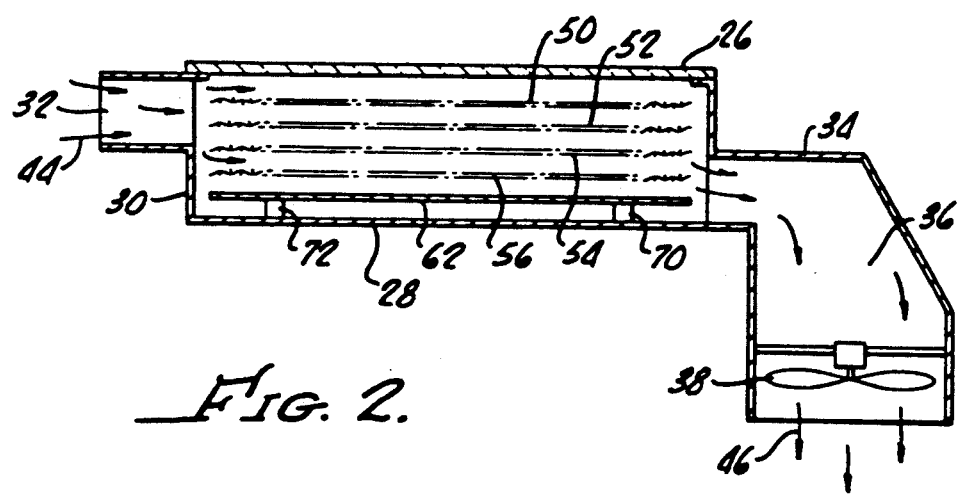
FIG. 2 is a side view of the heat transfer unit of FIG. 1.
Figure 3:
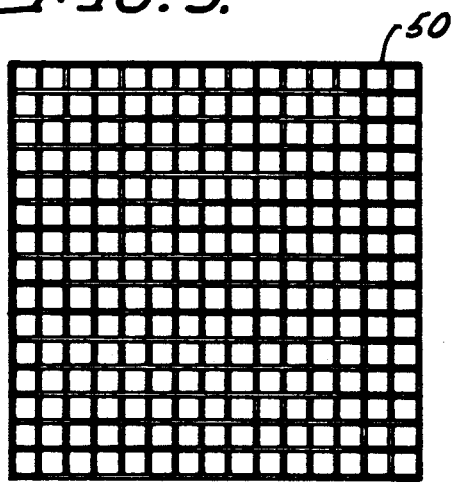
FIGS. 3, 4, 5 and 6 show assemblies or fragmentary parts of assemblies of 1, 2, 3 and 4 thermally conductive grids, respectively, that may be employed for heat transfer.
Figure 4:
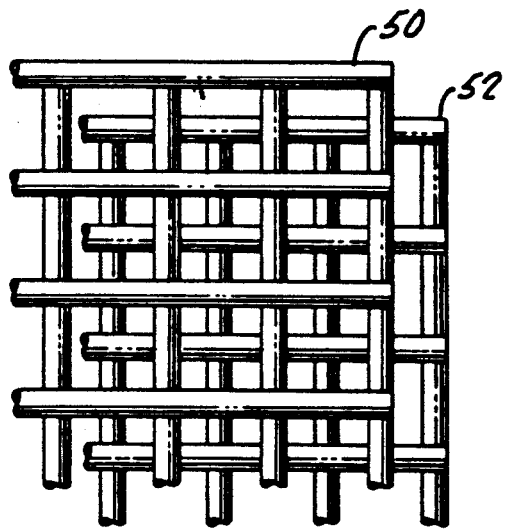
Figure 5:
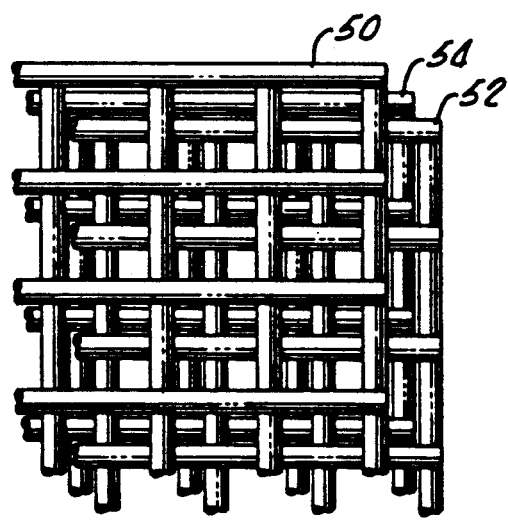
Figure 6:
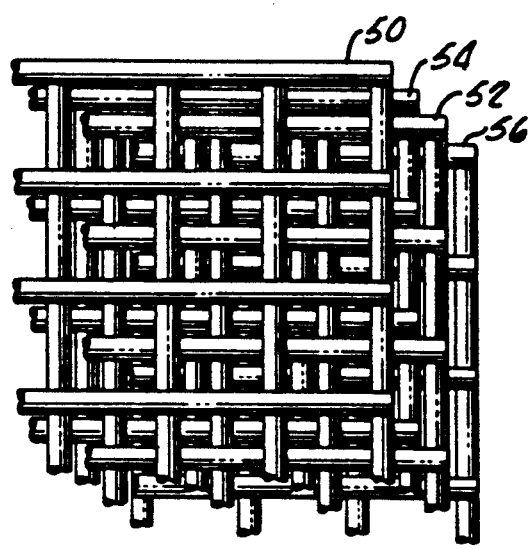
Figure 7:
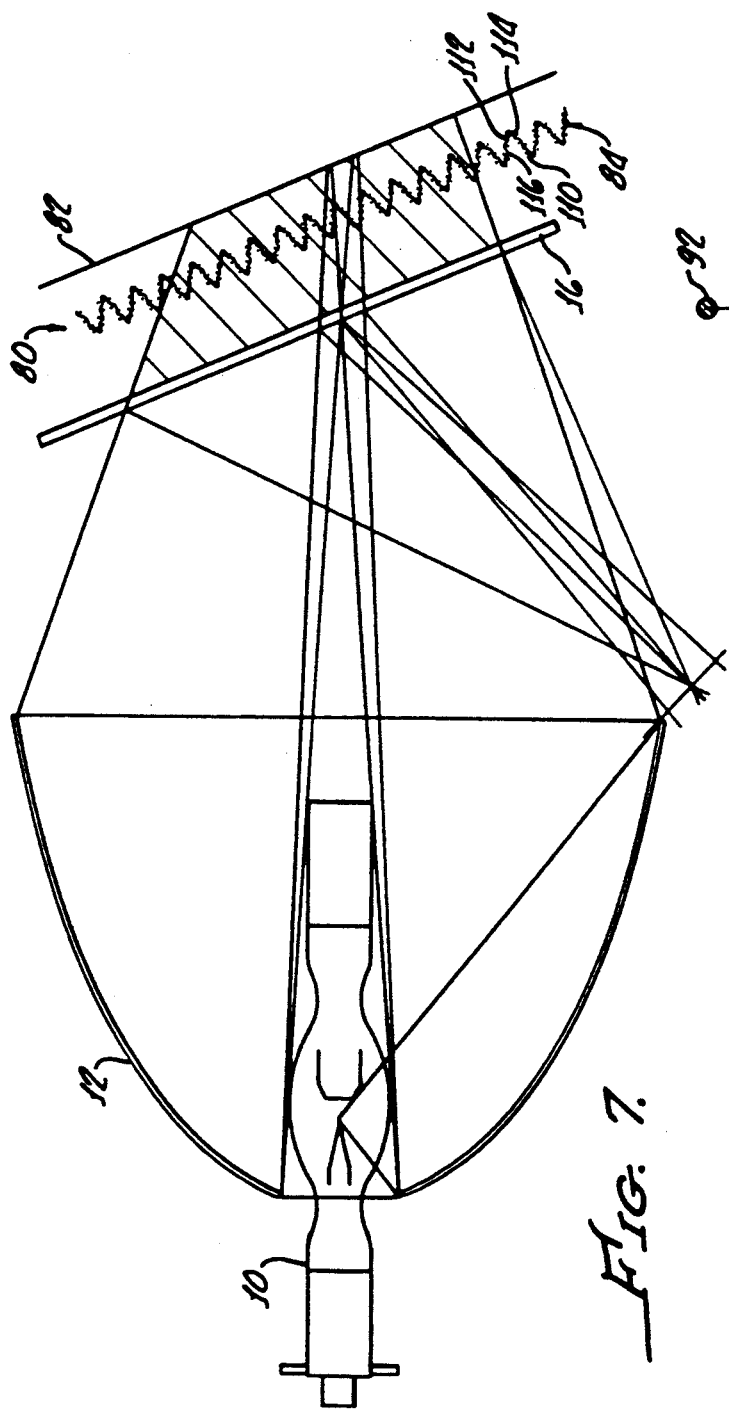
FIG. 7 illustrates a convoluted form of heat transfer unit.

In an alternate embodiment, as illustrated in FIG. 7, arc lamp 10 and reflector 12 generate light that is transmitted to the cold mirror 16, at the rear side of which is positioned a modified heat transfer unit, generally indicated at 80 in FIG. 7. The components of this heat transfer unit include a solid non-perforated reflective backup plate 82, which may be identical to the backup plate 62 of FIGS. 1 and 2. However, in this arrangement instead of using substantially planar grids, as in the embodiment of FIGS. 1 and 2, there is provided a single reticulated sheet 84 having a convoluted surface. The convoluted sheet 84 and backup plate 82 are mounted in a housing (not shown in FIG. 7) that may be substantially similar to the housing in which are mounted the four grids and backup plate of FIGS. 1 and 2. The convoluted surface sheet 84 may be formed, like the grids of FIGS. 1 and 2, of a perforated or reticulated sheet in the form of a grid having openings defined by a series of intersecting horizontal and vertical steel wires of round cross-section. Convolution of the surface may be of any desired configuration, but in one example, as illustrated in FIG. 7, the surface of the sheet is corrugated. Conveniently, a flat sheet of woven screening is bent to form the described convoluted configuration.

Figure 9:
FIGS. 8 and 9 schematically depict operation of the convoluted heat exchanger grid of FIG. 7.
Figure 8:
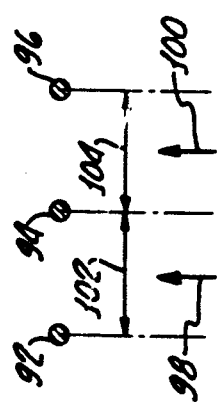

Operation of the heat absorbing and heat re-radiating abilities of the corrugated sheet may be explained in connection with the simplified sketches of FIGS. 8 and 9. In FIG. 8 there is shown a cross-section of the three adjacent wires 92,94,96 that form three of the wires of a flat grid, with the surface of such grid being perpendicular to the direction of arrows 98,100, which represent the direction of transmission of heat that is to be transferred by the grid unit. It can be seen from FIG. 8 that with the orientation of the sheet, including wires 92, 94 and 96, in a plane substantially perpendicular to the direction of propagation of arrows 98,100, relatively large spaces 102,104 exist between adjacent wires 92,94, and 96. However, if the grid which includes wires 92, 94 and 96 is positioned at an angle with respect to the direction of heat radiation represented by arrows 98,100, as shown in FIG. 9, the size of effective spaces 106,108 between adjacent wires 92,94 and 94,96 is considerably decreased. Effectively then, by positioning the plane of the grid at an oblique angle to the direction of transmission, a larger mass (e.g. more wires) of heat absorbing material 92,94,96 is presented to the incoming heat, and, concomitantly, smaller spaces are provided for the incoming heat to pass through.

This oblique orientation of parts of the sheet surface is effectively what occurs when the surface of the grid is corrugated or convoluted as indicated in FIG. 7. Corrugations include peaks 110 and valleys 112, for example, with portions 114 and 116 extending between the peaks and valleys. These surface portions 114 and 116 are effectively positioned at oblique angles to the direction of incoming heat, and thus provide a greater mass and greater surface area upon which the incoming heat will impinge. Thus the grid 84 with its convoluted surface is more effective in absorbing incoming radiation than is a single flat or planar surface grid of similar dimensions of wires and apertures. To the extent that reflection of heat will occur from elements of the convoluted surface of the embodiment of FIG. 7, it is highly likely that such reflection will occur in a direction other than directly back toward the mirror or heat source because of the angulated orientation of major portions of the convoluted surface.

The heat transfer unit described herein has a number of heat dissipation features which contribute to efficiency, reliability and life of an optical imaging system. The described apparatus results in rapid and efficient dissipation of heat energy associated with the infrared light and thereby optimizes overall power consumption of the optical imaging system. Heat dissipation is maximized with minimum consumption of power needed for cooling of the heat dissipation device. Both improved compactness and decreased cost are achieved because of the speed and efficiency of the heat dissipation employing minimum components. Size and cost of the light source and other components of the system are also greatly decreased because of the improved efficiency of heat dissipation. Where the optical components of the system are enabled to operate at lower temperatures, the various components need not be separated from one another by as great a distance to allow adequate heat transfer, flow of cooling air and to prevent component melting. Further, the described apparatus results in safe operation and generally decreased temperature of all the parts, which will allow the parts to cool down more rapidly after shut-off, and thereby employ less power for the purpose of cooling the apparatus.

What is claimed is:

1. A high intensity light source comprising:
   lamp means for projecting a high intensity beam in a first direction, said beam including light of visible and infrared wavelengths,
   a cold mirror positioned in the path of said light and configured and arranged to transmit light of infrared wavelengths and to reflect light of visible wavelengths, and
   a heat transfer unit positioned adjacent said mirror and arranged to receive light of infrared wavelengths transmitted by said mirror, said heat transfer unit comprising:
   a housing,
   apertured sheet means in said housing, and
   means for flowing a cooling gas through said housing and over said sheet means.

2. The apparatus of claim 1 wherein said housing has an opening adjacent to and substantially coextensive with said mirror, a solid heat transmissive window covering said opening, said sheet means including a plurality of mutually offset and mutually spaced apertured sheets adjacent said window.

3. The apparatus of claim 2 wherein said housing has a rear wall, and including a continuous backing plate interposed within said housing between said rear wall and said apertured sheet means.

4. The apparatus of claim 2 wherein said sheet means comprises a plurality of mutually spaced and mutually parallel apertured sheets within said housing, and a continuous heat reflective backing sheet positioned in said housing between said apertured sheets and said housing, the apertures of said sheets being misaligned from one sheet to the next.

5. The apparatus of claim 1 including a continuous backing sheet within said housing, and wherein said apertured sheet means comprises a sheet having a convoluted surface interposed between said backing sheet and said mirror.

6. The apparatus of claim 5 wherein said convoluted sheet has a plurality of surface portions extending at oblique angles to said first direction.

7. The apparatus of claim 1 wherein said sheet means comprises a reticulated sheet of metal wire.

8. The apparatus of claim 1 wherein said sheet means comprises a woven screen of heat conductive wire.

9. The apparatus of claim 8 wherein said wire has a diameter of between about 0.020 and 0.030 inches and defines open spaces between wires having dimensions of approximately 0.1 inches.

10. A method of removing heat generated from a high intensity light source, said method comprising:
    projecting a high intensity beam containing both visible and infrared light from the source in a first direction;
    using a mirror positioned in the path of the beam to transmit infrared light through the mirror while reflecting visible light;
    positioning a heat transfer unit adjacent the mirror to receive infrared light transmitted through the mirror;
    orienting at least one apertured sheet in the heat transfer unit so that the infrared light strikes the sheet; and
    cooling the sheet.

11. The method of claim 10 which further comprises:
    mounting a plurality of mutually spaced apertured sheets in the heat transfer unit; and
    flowing a cooling gas over the sheets.

12. The method of claim 11 which further comprises:
    reflecting infrared light passing through the sheets back towards the sheets.

13. The method of claim 12 which further comprises:
    misaligning apertures in adjacent sheets.

14. The method of claim 10 wherein said sheet has a convoluted surface, and wherein the method further comprises orienting the sheet at an oblique angle relative to the first direction of the beam.

15. The method of claim 10 wherein the beam provides a light source for a liquid crystal video projector.

* * * * *